／United States Patent [19]
Collins et al.

[11] 3,805,347
[45] Apr. 23, 1974

[54] SOLID STATE LAMP CONSTRUCTION

[75] Inventors: Neil E. Collins, Richmond Heights; Raymond R. Neville, Mayfield Heights, both of Ohio

[73] Assignee: General Electric Company, Schenectady, N.Y.

[22] Filed: Nov. 4, 1971

[21] Appl. No.: 195,624

Related U.S. Application Data

[63] Continuation of Ser. No. 888,484, Dec. 29, 1969, abandoned.

[52] U.S. Cl. ......... 29/25.13, 313/108 D, 317/234 E, 317/234 G

[51] Int. Cl. ......... H01j 9/18

[58] Field of Search ....... 313/108 D, 110; 29/25.13; 317/234 R, 234 E, 234 G, 235 N

[56] References Cited

UNITED STATES PATENTS

| | | | |
|---|---|---|---|
| 3,596,136 | 7/1971 | Fisher | 313/108 D X |
| 3,501,676 | 3/1970 | Adler et al. | 317/235 X |
| 3,458,779 | 7/1969 | Blank et al. | 313/108 D X |
| 3,510,732 | 5/1970 | Amans | 313/110 |

FOREIGN PATENTS OR APPLICATIONS

| | | | |
|---|---|---|---|
| 1,243,268 | 6/1967 | Germany | 313/108 D |

OTHER PUBLICATIONS

Roy et al., IBM Tech. Bull., Vol. 7, No. 1, June 1964.

*Primary Examiner*—Roy Lake
*Assistant Examiner*—J. W. Davie
*Attorney, Agent, or Firm*—Norman C. Fulmer; Henry P. Truesdell; Frank L. Neuhauser

[57] ABSTRACT

A lamp construction in which a lens is positioned with respect to a light-emitting diode element so as to shape the light beam in a desired pattern. An epoxy material, having an index of refraction greater than unity, is placed over the diode element and is provided with a convex meniscus curved surface so as to direct the emitted light toward the lens. The efficiency of the lamp is thus increased by a two-step process: first, the epoxy material causes an increase in the critical angle of the light-emitting diode whereby a greater amount of light is emitted; and, second, the shaped epoxy directs a major amount of the emitted light toward the lens. The invention is economically manufactured, by applying the epoxy in liquid form over the diode element whereupon it hardens and naturally assumes the desired convex meniscus curvature.

2 Claims, 2 Drawing Figures

SOLID STATE LAMP CONSTRUCTION

CROSS-REFERENCES TO RELATED APPLICATIONS

This is a continuation of U.S. Pat. application Ser. No. 888,484, filed Dec. 29, 1969 now abandoned.

BACKGROUND OF THE INVENTION

The invention is in the field of solid state lamp assemblies. Such lamps are usually made from a flat "chip" of material, such as gallium arsenide, gallium phosphide, or silicon carbide, suitably doped with dopant material so as to form a p-n junction which emits light (visible or infrared) when current is passed therethrough. Of the light emitted by the junction, only a small fraction exits through the surface of the diode, due to the "critical angle" of the diode material whereby most of the light becomes reflected and absorbed within the diode material. The relatively small amount of light that does exit through the diode surface becomes refracted so as to form a hemispherical or Lambertian light distribution pattern externally of the diode. For the foregoing reasons, solid state light sources are inefficient and produce light of low intensity.

One way of increasing the efficiency and light output of a light-emitting diode, is to shape the diode material into the form of a sphere or partial sphere, with the light-producing junction located in the region between the center and the Weierstrass radius of the sphere. This technique is not entirely feasible, since the diode material is expensive, and difficult to machine spherically, and has a high coefficient of light absorption whereby the greater amount of material required for forming the sphere absorbs a considerable amount of light. Another technique, somewhat similar in effect to that just described, is to encapsulate a light-emitting diode chip at a point between the center and Weierstrass radius of a spherically shaped material having a refractive index greater than unity, or greater than that of air, thereby increasing the critical angle of the diode whereby a greater amount of light exits from the diode surface. A technique for increasing brightness of a lamp assembly when a narrow-angle light beam is desired or is tolerable, is to provide a focusing lens for concentrating the emitted light over a relatively narrow beam configuration.

Although the prior art techniques for improving the light output of solid state lamps have been helpful, there has been a need for inventing arrangements for further increasing the efficiency and light output, and for doing so in a manner that is feasible and economical to manufacture.

SUMMARY OF THE INVENTION

Objects of the invention are to provide an improved solid state lamp assembly, and to provide a solid state lamp assembly having increased efficiency and light output.

The invention comprises, briefly and in a preferred embodiment, a light-emitting diode element, a lens positioned with respect to the diode element for shaping the emitted light rays in a desired pattern, and an epoxy material having a refractive index of greater than unity positioned over the light-emitting surface of the diode element. The epoxy material is provided with a convex meniscus curved surface, and functions both to increase the critical angle of the diode to increase the amount of light emitted from the diode, and also to focus the increased amount of light toward the lens, thereby increasing the efficiency and light output of the lamp by a two-step process. The invention also includes a method for economically manufacturing the lamp, comprising the steps of applying a hardening-type epoxy in liquid form over the diode element whereupon the epoxy hardens and naturally assumes the desired convex meniscus curvature.

DESCRIPTION OF THE PREFERRED EMBODIMENT

Figure 1:
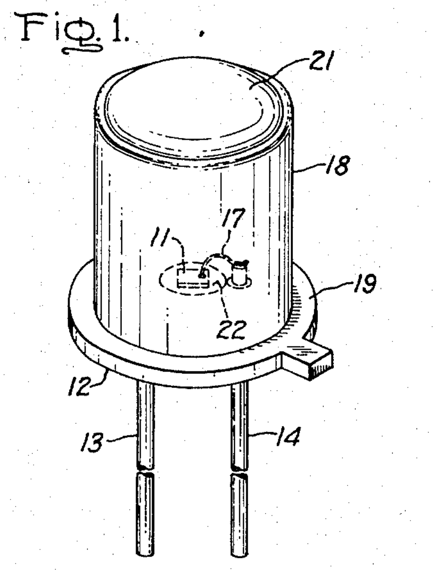
FIG. 1 is a perspective view of a preferred embodiment of the invention, internal construction being shown by dotted lines.
Figure 2:
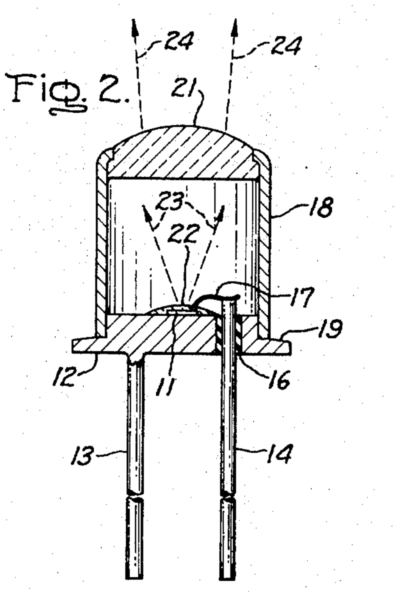
FIG. 2 is a side cross-sectional view of the preferred embodiment.

The preferred embodiment of the invention, as shown in the drawing, comprises a solid state light-emitting diode 11 mounted on a circular metal header 12. An electrical connection lead 13 extends from the header 12, and a second electrical connection lead 14 extends through an opening in the header 12 and is insulated therefrom by an insulator 16. A connector wire 17 connects the inner end of the lead 14 to the upper surface of the diode 11, the lower surface of the diode 11 being electrically connected to the lead 13 via the header 12. A circular shell 18, preferably of metal but which can be of a plastic material, is concentrically positioned on the header 12 and welded or otherwise attached thereto at a flange 19. A focusing lens 21 is mounted to the upper end of the shell 18. For further details of a suitable light-emitting diode 11 and its attachment to a header having a surrounding shell and lens, reference is made to U.S. Pat. No. 3,458,779, issued July 29, 1969 to Drs. Blank and Potter and assigned to the same assignee as the present invention.

In accordance with the invention, an encapsulant 22 of glass, or plastic such as an acrylic, or epoxy, is positioned over the diode element 11, and the upper surface thereof is in the shape of a convex meniscus as shown in the drawing. The encapsulant 22 preferably is a material having an index of refraction greater than unity; i.e., greater than that of vacuum or air, and is transparent to the light emitted from the diode element 11.

The encapsulant 22, having a refractive index greater than unity, functions to increase the critical angle of the diode 11, thereby increasing its light output in well-known manner; and, at the same time, it functions as a lens for directing the hemispherically (or Lambertian, etc.) radiated light from the diode 11 into a narrower beam directed toward the lens 21 as indicated by the light-ray arrows 23. This results in a two-step increase in lamp efficiency and brightness: first, the light output of the diode 11 is increased by virtue of its critical angle being increased by the encapsulant 22; and, second, the increased light output of the diode is focused, by the shaped encapsulant 22, toward the lens 21. The lens 21 then focuses the light into a narrow beam as indicated by the light-ray arrows 24, or, alternatively, into a wider-angle beam if desired. It has been found that the invention more than doubles the light output of a lamp.

In accordance with a feature of the invention, the shaped encapsulant 22 is manufactured reliably and inexpensively by a method comprising the steps of applying a hardening-type epoxy in liquid form over the diode element 11 whereupon the epoxy hardens and naturally assumes the desired convex meniscus outer curvature.

While a preferred embodiment of the invention has been shown and described, other embodiments and modifications will become apparent to persons skilled in the art, and will be within the scope of the invention as defined in the following claims.

What we claim as new and desire to secure by Letters Patent of the United States is:

1. A method of making a solid state lamp assembly, comprising the steps of attaching a substantially flat solid state light-emitting element onto a substantially flat surface of a support member, applying a hardening-type light-transmitting material in liquid form over said light-emitting element and permitting said material to harden, the quantity of said material being such that upon hardening it naturally assumes a thin lens having a convex meniscus outer curvature over said light-emitting element with the outer edge of the material lying on said substantially flat surface of the support member around said light-emitting element, and positioning a lens element over, and in spaced axial alignment with respect to, said convex meniscus outer curvature of the light-transmitting material.

2. A method as claimed in claim 1, in which said light-transmitting material is an epoxy material having an index of refraction greater than unity.

* * * * *